United States Patent Office 3,353,000
Patented Nov. 14, 1967

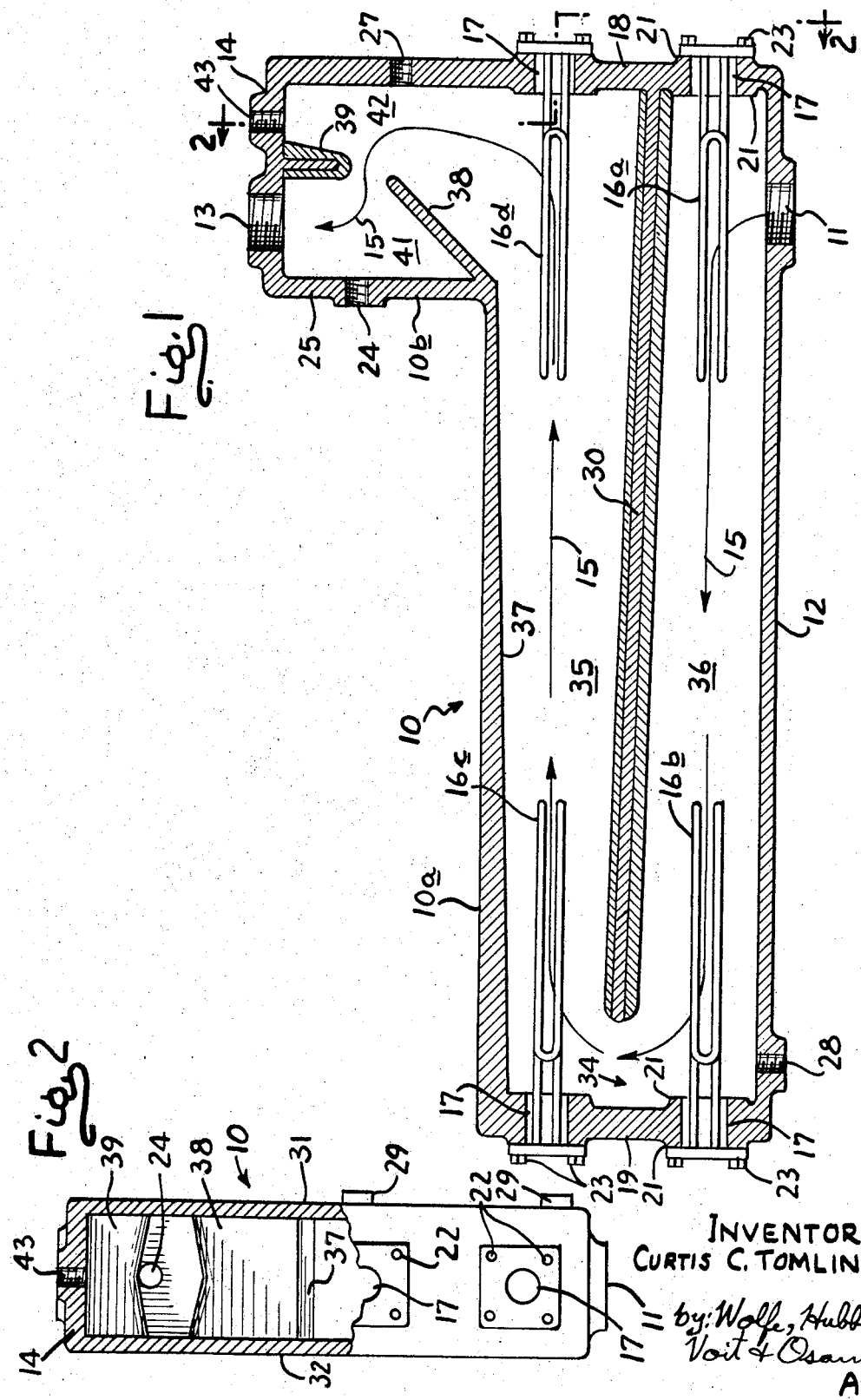

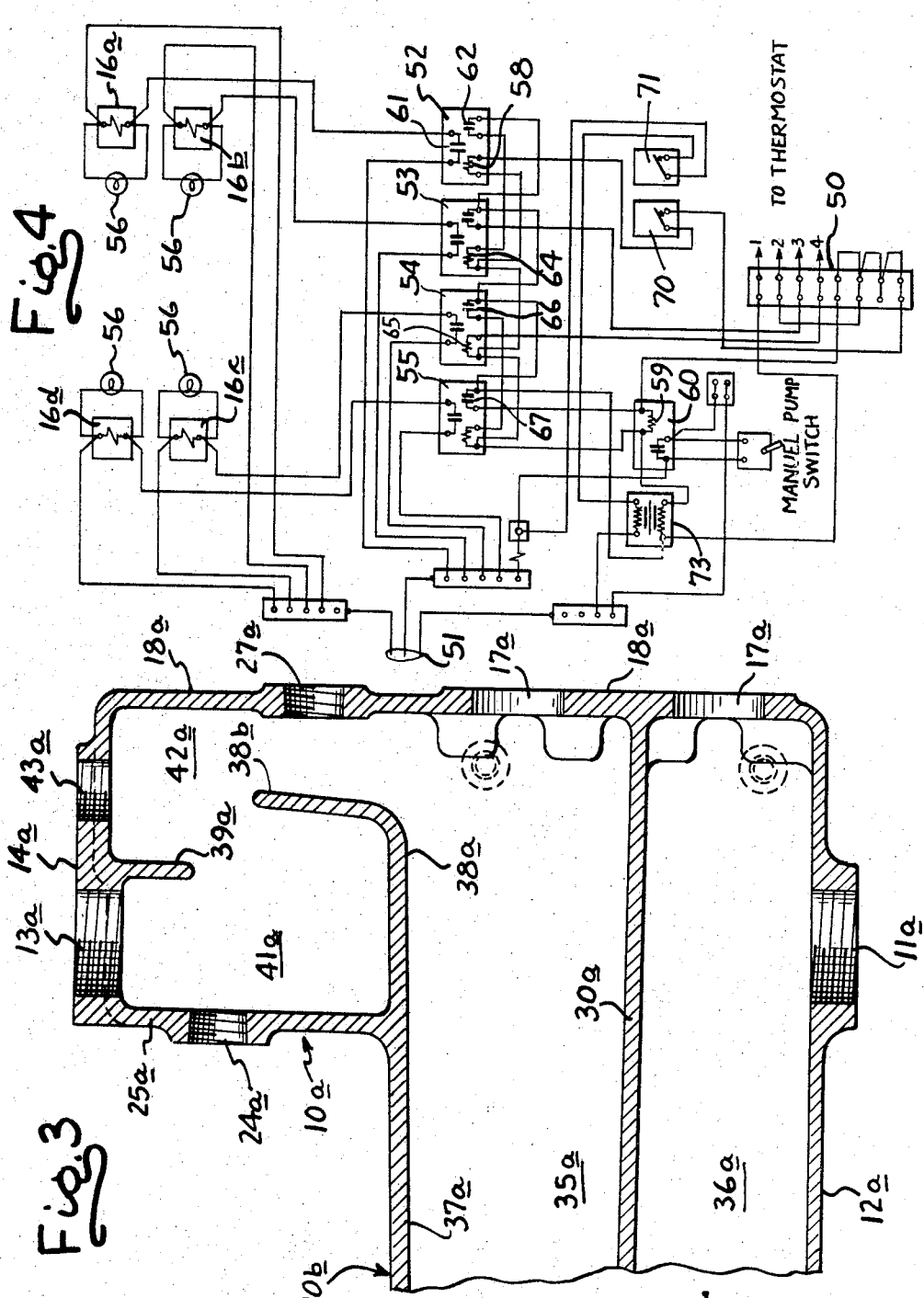

3,353,000
CAST VESSEL FOR AN ELECTRIC HOT WATER HEATING BOILER
Curtis C. Tomlinson, Michigan City, Ind., assignor to Weil-McLain Company, Inc., Michigan City, Ind., a corporation of Indiana
Filed Mar. 2, 1965, Ser. No. 436,470
6 Claims. (Cl. 219—321)

ABSTRACT OF THE DISCLOSURE

Electric hot water heating boiler wherein electric immersion heating elements transfer heat energy to circulating water by conduction while overcoming problems and disadvantages of flash vapor and entrained air for continuous controlled operation without damage to the vessel or immersion heaters.

Electric hot water heating boiler of the foregoing type employing an internal diversion baffle for directing water flow through the boiler past the heating elements and serving to wipe entrained air from the water traveling through the boiler; water diversion means for preventing entrained air from accumulating into pockets around the heating elements; and a separator to positively carry air removed with the wiping action of the diversion means from the water to the separator.

An electric hot water heating boiler operative even without positive pumping or forcing of water through the boiler which permits the water to be carried through the boiler by gravity through the convection currents.

---

The present invention relates to electric hot water heating boilers, and more particularly to a compact cast water vessel for an electric hot water heating system. This application is a continuation in part of my copending application, Ser. No. 409,725, filed Nov. 9, 1964.

Electric hot water heating boilers wherein heat energy, provided by an electric immersed heating element, is transferred to circulating water by conduction are considered to be very desirable and practical for heating purposes. They are, however, subject to disadvantages, especially when attempting to provide a small capacity electric boiler designed for wall mounting or the like due to their inherent mode of operation giving rise to problems of flash vapor and entrained air that occur when a large concentration of heat is transferred by conduction to a small volume of water.

The problem of flash vapor occurs when small volumes of water in a boiler are held motionless at a heating element, and due to the capacity of the heating element the water becomes superheated and changes to steam. When this condition occurs, a noise is produced which sounds much like the sound made by a hot iron that has been suddenly plunged into water.

The problem of entrained air occurs when air becomes admixed with the water as a result of turbulation in a circulating pump such as normally used to flow water through a boiler. When the water moves beyond the pump into the boiler, where the velocity of the water is slower, the air tends to separate into large bubbles which, if allowed to collect, become trapped in areas such as around the heating element, which can expose the heating element causing a destruction of the element by overheating. The air bubbles, also, if permitted to travel through the heating system, can create a disturbing noise. This same air is also recirculated through the system and upon reaching the pump, it will again be admixed with the water and recycled through the boiler. Continuous operation under these conditions results in burning out of the heating elements.

Numerous different approaches have heretofore been utilized to overcome the inherent problems of flash vapor and entrained air. For example, one approach has been to utilize pipe or tube manifolds. However, such constructions do not permit achievement of small capacity electric boilers which are desirably compact and may be readily wall mounted. Consequently, a reversion has been made to vessels which contain large volumes of water.

Accordingly, it is a general aim of the present invention to provide an improved vessel for electric hot water heating boilers which overcomes the foregoing disadvantages of flash vapor and entrained air and which is characterized by its ability to transfer heat energy to circulating water by electric immersion heaters in a manner that will permit continuous controlled operation without damage to the vessel or immersion heaters.

A related object of the invention is the provision of an improved vessel for electric hot water heating boilers which employs an internal diversion baffle for directing water flow through the boiler past the heating elements and which serves to wipe entrained air from the water traveling through the boiler. In this connection, it is an object to provide a unitary vessel for an electric boiler with water diversion means for preventing entrained air from accumulating into pockets around the heating elements and which provides a separator to positively carry air removed by the wiping action of the diversion means from the water to the separator.

It is a more specific object of the invention to provide an improved vessel for an electric hot water heating boiler which is compact in size yet which can be readily mounted on a wall and which reduces the criticality of having the unit level on the wall and may be mounted without the necessity of precisely leveling the unit.

In another of its important aspects, it is an object of the invention to provide a compact, unitary water vessel for an electric hot water heating boiler in cast form wherein the operating controls, heating elements and other related components may be grouped and wired to provide a simple, reliable and versatile heating system.

An ancillary object of the invention is to provide an electric hot water heating boiler characterized by its ability to operate even without positive pumping or forcing of water through the boiler yet permits the water to be carried through the boiler by gravity due to convection currents and by virtue of having no pockets in which air can be trapped, eliminates any possibility that the burner elements may be burned out by being enveloped by a pocket of trapped air.

Other objects and advantages of the invention will become apparent as the following description proceeds, taken in conjunction with the accompanying drawings, in which:

FIGURE 1 is a general side view of an exemplary vessel for an electric hot water heating boiler embodying the features of the present invention, such vessel here shown in section and depicting the internal arrangement of the diverting baffles, air separation chamber and heating element;

FIG. 2 is an end view along the line 2—2 of the apparatus shown in FIG. 1;

FIG. 3 is a fragmentary front view, similar to FIG. 1, but here depicting a slightly modified air separator also embodying the features of the present invention; and FIG. 4 is a diagram of an electrical circuit for use with the electric boiler of the present invention.

While the invention is susceptible of various modifications and alternative forms, specific embodiments have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Referring now to the drawings, and particularly to FIGS. 1 and 2, there is illustrated a cast electric boiler vessel 10, of generally L-shaped construction having an elongated horizontal portion 10a and a raised portion 10b. A water inlet 11, provided in the bottom wall 12 of the horizontal portion 10a and an outlet 13 is provided in the top wall 14 of the raised portion 10b for water flowing through the boiler which travels in a path generally illustrated by arrows 15. Elongated hairpin type heating elements 16a-d are mounted within openings 17, provided at opposite end walls 18, 19 of the vessel. The openings 17 are provided with internal and external bosses 21 having bolt holes 22 for securing the heating elements in place by bolts 23.

For the purpose of providing access for a temperature sensing element (not shown) directly in the hot water flow, an opening 24 is provided in end wall 25 of the raised portion 10b, immediately below the outlet opening 13. In addition thereto, there is provided an opening 27 for location of a relief valve and drain opening 28 for permitting access to the water chamber. For the purpose of securing the vessel to a wall or cabinet, there is provided integrally formed mounting bosses 29 which are drilled and tapped for receiving mounting bolts.

In carrying out the present invention, provision is made for providing a pathway for the flow of water to the boiler past the heating elements successively, and which also provides means to "wipe" entrained air from the water traveling through the boiler where the air may bubble up to the inside upper surface of the vessel for release thereof through a vent opening at the top of the vessel. To accomplish this, as seen in FIG. 1, there is provided an internal baffle 30 integrally formed with the end wall 18 and side walls 31, 32 of the vessel. The baffle 30 extends longitudinally along the horizontal portion 10a of the vessel sloping upwardly from the front to the rear and terminating a spaced distance before the end wall 19 of the vessel to define a passageway 34 between the upper and lower chambers 35, 36 formed by the baffle. The upper internal wall 37 of the horizontal portion 10a is sloped upwardly from the end wall 19, adjacent the passageway between the upper and lower chambers, toward the end wall 18 adjacent the raised portion 10b. Thus, water flowing through the vessel is directed from the inlet 11 to the outlet 13 along a serpentine path past each of the heating elements 16a-d with the sloped baffle serving to strip and direct air from water flowing through the lower chamber to the passageway and thence to the sloped upper internal wall which, in turn, serves to strip and direct air from water flowing through the upper chamber toward the outlet.

In order to insure that there are no pockets where air and water may be trapped, both the upper wall 37 and the baffle 30 are sloped at angles slightly less than 5°, consequently, they serve to positively carry air which is stripped or wiped away by friction as the water flows through the chambers toward the outlet.

In keeping with this form of the invention, it will be appreciated that due to the slope of the baffle 30 and of the internal surface upper wall 37, the criticality of having the unit levelly mounted is reduced and the vessel may be mounted without the necessity of precise levelling which might otherwise be necessary.

In accordance with another important aspect of the present invention, means are provided for separating air from the water prior to its flowing through the outlet 13 of the vessel. Thus, there is provided a second baffle 38 angularly disposed in the raised portion 10b of the vessel and beneath the water outlet. An integrally formed projection 39, extending from the top wall 14 of the raised portion 10b of the vessel defines a passageway for the water to flow to the outlet via a chamber 41. On the opposite side of the projection 39 and baffle 38 there is defined an air separation chamber 42, where entrained air separates by a mild turbulence created by the change in flow directed around the baffle 38 and passes off through a vent opening 43 at the top wall 14 of the vessel.

Referring now to FIG. 3, a slightly modified form of air separating means indicated at 38a has been depicted. In this instance, the upper wall 37a of the horizontal portion 10a extends horizontally across the opening leading to the raised portion 10b of the vessel and terminates in an upturned end 38b, slightly angled toward the end wall 18a of the vessel. Thus, the arrangement is such that the water is positively directed over a larger segment of the adjacent heating element 16d for providing additional wiping action of the water over that element. In addition, the water is subjected to a more abrupt change in direction with the exit being closer to the end wall 18a and the end of the baffle 38b being spaced from the projection 39a, thus eliminating the possibility of short circuiting of the water flow directly at the outlet and yet providing the necessary turbulence for operation of the air separator.

It will be seen that the vessel construction in accordance with the present invention serves to eliminate the entrained air which has become a homogeneous part of the circulating water as a result of the turbulation in the pump, and avoids the occurrence of flash vaporization wherein water around the heating elements may be changed to steam due to the small volume of water passing through the vessel. Thus, in the present invention, the internal baffle 30a directs the water successively past the heating elements 16a-d at a rate sufficient enough to dissipate heat from the elements before a vapor can be produced. Similarly, the problem of removing air from the water is eliminated by sloping the baffle 30a and the internal upper wall 37a of the vessel leading to the air separator to eliminate any air pockets and to positively carry the air removed by frictional wiping action of the water against the baffle to direct it to the air separator. Entrained air is eliminated from the water not only by friction of the baffle tending to strip and float the air off in the form of larger bubbles, but at the separator, mild turbulence is created by the second baffle member 38a which tends to release the air bubbles to flow out through the vent at the top of the boiler.

In accordance with one of the important features of the present invention, the boiler is capable of operating even without positive pumping or forcing of water through the boiler. Thus, due to the path set up by the baffle 30 leading the water successively past the heating elements, convection currents will carry the water through the boiler by gravity feed. By the same token, if the water is flowed through the boiler positively by a pump, convection currents will continue to flow the heated water through the boiler into the system without the risk of burning up the heating elements, should there be a misfunction of the pump. Since there are no pockets for water to be trapped around the heating elements, there is an elimination of any possibility that the heating elements may be burned out by being enveloped by a pocket of trapped air.

In explaining the practical operation of the heating system utilizing an electric heating boiler of the present invention, it is helpful to consider the exemplary control system, as shown in FIG. 4. Room temperature control for a heating system utilizing the present boiler is preferably operated by a two-stage 24 volt heating thermostat (not shown) which permits of an increased capacity for very cold weather and also permits a capacity reduction for mild weather conditions. Thus, four low voltage wire leads are connected to terminals 1, 2, 3 and 4 on the low voltage terminal board 50. A 240 volt single phase three-wire power input 51 is utilized to provide a voltage to the heating elements via sequencing switches 52–55, respectively, to be discussed in more detail below.

For the purpose of indicating when the heating elements are energized, each is provided with a pilot light 56.

Turning to the sequence of operation at the boiler, when the room temperature drops at the thermostat, the first-stage contacts close, closing the circuit between terminals 1 and 2 of the low voltage terminal board so that a voltage is applied simultaneously to a warp switch 58 of sequencer 52 and a warp switch 59 of the pump relay 60. After a fifteen second delay, the pump relay closes and starts the circulating pump (not shown). An additional delay of thirty seconds is required for the sequencer 52 main contacts 61 to close, energizing the 16a heating element. Also, a set of pilot contacts 62, located on sequencer 52 activates a warp switch 64 in sequencer 53 and after a forty-five second delay the heating element 16d is energized.

When mild weather conditions are encountered, these two heating elements 16a and 16d will maintain the required temperature and the remaining elements 16b and 16c will not be utilized. As the temperature level reaches the thermostat setting, stage 1 contacts open and the warp switches 58, 59 on the sequencer 52 and the pump relay, respectively, cool down to open the main and pilot contacts. The setting is so that approximately forty-five seconds pass for the sequencer and ninety seconds pass for the pump relay. Opening of the pilot contacts 62 on sequencer 52 interrupts the flow of current to the warp switch 64 of sequencer 53 and forty-five seconds later it too opens and turns off heating element 16d. Since the pump delay is ninety seconds, the pump will remain on until both heating elements have been turned off.

When cold weather conditions are encountered, the first stage of operation, i.e., only two heating elements functioning, will not hold the preset temperature and the stage 2 contacts of the thermostat will also close. Thus, the circuit to terminals 3 and 4 in the low voltage terminal board is closed and the warp switch 65 on sequencer 54 closes, thus energizing heating element 16b. The pilot contact 66 on sequencer 54 closes, energizing sequencer 55. Thus, heating elements 16b and 16c are energized in about forty-five second intervals, as governed by the sequencers 54 and 55, respectively.

For the purpose of insuring that the temperature is not increased too high during shut-down, sequencer 55 locks in the pump relay when the pilot contact 67 closes and holds it until all four heating elements have been shut down.

In the cold weather operation, with all four heating elements operating, should the room temperature reach the level of the thermostat setting, stage 2 contacts will open, allowing heating elements 16b and 16c to be shut off. Heating elements 16a and 16d will continue to operate, and only the last two heating elements will cycle on and off. Should the increase in room temperature continue, heating elements 16a and 16d will be turned off, causing the system to shut down completely as described for stage 1 operation.

For the purpose of insuring that the system will shut down, with the exception of the pump, in the event the water temperature exceeds safe limits, a low limit switch 70 is provided which will open the circuit to the sequencers, thereby turning off the heating elements in approximately three minutes. Also, a high limit switch 71 is provided for preventing water temperature from exceeding design conditions, and if opened shuts off the voltage to the transformer 73, thereby shutting off the entire system.

While the exemplary boilers shown in FIGS. 1 and 3 and the control circuit shown in FIG. 4 have been depicted as including only four heating elements and one internal baffle member for directing water flow past each of the four elements successively, it will be appreciated that additional heating elements and baffles may be utilized in accordance with the present invention for increasing the capacity of the boiler.

I claim as my invention:

1. In an electric hot water heating boiler having a cast water vessel of generally L-shaped construction, including an elongated horizontal portion having first and second ends and a raised portion, a water inlet at the bottom of said horizontal portion adjacent said first end, an outlet at the top of said raised portion, an internal baffle integrally formed with said vessel, extending longitudinally within said horizontal portion and defining upper and lower chambers therein, means defining a passageway between said chambers adjacent said second end, said baffle sloping upwardly toward said passageway, the upper internal surface of said horizontal portion sloping upwardly from said passageway toward said raised portion, said upwardly sloping baffle serving to strip and direct air from water flowing through said lower chamber via said passageway to said sloping upper internal surface, the latter surface further serving to strip and direct air from water flowing in said upper chamber toward said raised portion, a plurality of immersion heating elements mounted in said horizontal portion, said heating elements being disposed on opposite sides of said baffle and within said upper and lower chambers, means defining an air vent at the top of said raised portion and air separation means in said raised portion for diverting water through said outlet and separated air through said air vent.

2. An electric hot water heating boiler as defined in claim 1, wherein said baffle and said upper internal surface of said horizontal portion have a slope of approximately 5°.

3. An electric hot water heating boiler comprising a cast water vessel of generally L-shaped construction, including an elongated horizontal portion having first and second ends and a raised portion, a water inlet at the bottom of said horizontal portion adjacent said first end, an outlet at the top of said raised portion, a first internal baffle integrally formed with said vessel extending longitudinally with said horizontal portion and defining upper and lower chambers therein, means defining a passageway between said chambers adjacent said second end, said baffle sloping upwardly toward said passageway, the upper internal surface of said horizontal portion sloping upwardly from said passageway toward said raised portion, a plurality of immersion heating elements mounted in said horizontal portion, said heating elements being disposed on opposite sides of said first baffle and within said upper and lower chambers, a second baffle integrally formed with said raised portion below said outlet and sloping upwardly toward the top of said raised portion, said raised portion having an integrally formed projection extending downwardly toward said second baffle and spaced therefrom, said second baffle and said projection defining an outlet chamber on the side beneath said outlet and an air separation chamber on the opposite side thereof, and means defining a vent opening on said separation chamber side for exiting air extracted from water flowing through the boiler.

4. An electric hot water heating boiler as defined in claim 3, wherein said second baffle comprises an integrally formed extension of said upper internal surface of the horizontal portion which terminates in an upwardly, angularly extending end spaced from said downwardly extending projection.

5. An electric hot water heating boiler having a cast water vessel of generally L-shaped construction, including an elongated horizontal portion and a raised portion having first and second ends, a water inlet at the bottom of said horizontal portion adjacent said first end, an outlet at the top of said raised portion, an internal baffle integrally formed with said vessel, extending longitudinally within said horizontal portion and defining upper and lower chambers therein, means defining a passageway between said chambers adjacent said second end, said baffle sloping upwardly toward said passageway for stripping and directing air from water flowing through the lower chamber to said passageway, the upper internal surface of said horizontal portion sloping upwardly from said passageway toward said raised portion for stripping and directing air from water flowing to said upper chamber toward said raised portion, a plurality of immersion heating elements mounted in said horizontal portion, said heating elements being disposed on opposite sides of said baffle within said upper and lower chambers, means defining an air vent at the top of said raised portion, air separation means in said raised portion for diverting water through said outlet and separated air through said air vent, and control means for sequentially energizing selected ones of said heating elements for producing a predetermined heating output.

6. A water vessel for an electric hot water heating boiler having a unitary cast, generally L-shaped outline including an elongated horizontal portion having first and second ends and a raised portion, a water inlet at the bottom of said horizontal portion intermediate said ends, an outlet at the top of said raised portion, an internal baffle integrally formed with said vessel extending longitudinally within said horizontal portion and defining upper and lower chambers therein, means defining a passageway between said chambers adjacent said second end, said baffle sloping upwardly toward said passageway for stripping and directing air from water flowing through said lower chamber to said passageway, the upper internal surface of said horizontal portion sloping upwardly from said passageway toward said raised portion for stripping and directing air from water flowing through said upper chamber toward said raised portion, a plurality of immersion heating elements mounted in said horizontal portion and disposed on opposite sides of said baffle and within said upper and lower chambers, said baffle and sloping upper internal surface providing a pathway for convection currents to direct the flow of water through the vessel successively past said heating elements from said inlet to said outlet and means associated with said raised portion for releasing air extracted from water flowing through said vessel.

References Cited

UNITED STATES PATENTS

| | | | |
|---|---|---|---|
| 1,731,058 | 10/1929 | Pierson | 219—318 X |
| 1,973,577 | 9/1934 | Murphy | 165—111 X |
| 2,184,308 | 12/1939 | Leach | 165—160 X |
| 2,553,212 | 5/1951 | Rouis et al. | 219—321 |
| 2,710,908 | 6/1955 | Doniak | 219—298 X |
| 2,958,755 | 11/1960 | Miller | 219—486 |

ANTHONY BARTIS, *Primary Examiner.*